United States Patent [19]

Caughman, Jr.

[11] Patent Number: 5,595,654
[45] Date of Patent: Jan. 21, 1997

[54] SLUDGE FILTRATION SYSTEM AND METHOD

[75] Inventor: Carl R. Caughman, Jr., Houston, Tex.

[73] Assignee: Flo Trend Systetms, Inc., Houston, Tex.

[21] Appl. No.: 479,945

[22] Filed: Jun. 7, 1995

[51] Int. Cl.$^6$ .................................................. B01D 29/05
[52] U.S. Cl. ..................... 210/323.1; 210/241; 210/406; 210/416.1; 210/484
[58] Field of Search ................................... 210/241, 406, 210/416.1, 473, 484, 485, 291, 292, 293, 323.1, 497.01; 209/273

[56] References Cited

U.S. PATENT DOCUMENTS

| | | |
|---|---|---|
| 392,607 | 11/1888 | Heywood . |
| 798,200 | 8/1905 | Merrill . |
| 3,970,552 | 7/1976 | Bongert . |
| 4,871,454 | 11/1989 | Lott . |
| 4,929,353 | 5/1990 | Harris . |

FOREIGN PATENT DOCUMENTS

| | | |
|---|---|---|
| 3604616 | 8/1987 | Germany . |

Primary Examiner—Robert J. Popovics
Attorney, Agent, or Firm—Keeling Law Firm

[57] ABSTRACT

A sludge filtration system for separating the sludge liquids from the sludge solids. A container provides a basin for receiving and holding the sludge. Within the container, a first filter assembly, positioned proximal the container bottom, defines a first filtrate cavity. The first filter assembly is maintained below the sludge level so that a pump, in flow communication with the first filtrate cavity, provides for vacuum evacuation of the first filtrate cavity. Placing a valve in the first filtrate discharge conduit facilitates selective vacuum evacuation or gravitational evacuation of the first filtrate cavity. A second filter assembly extends about the inside perimeter of the container cavity proximal the container side walls. In addition, the second filter assembly extends from proximal the container bottom to the container top end. The second filter assembly defines a second filtrate cavity. A second filtrate discharge conduit provides for gravitational evacuation of the second filtrate cavity. Providing a valve in the second filtrate discharge conduit and providing a second pump in flow communication therewith facilitates selective vacuum evacuation or gravitational evacuation of the second filtrate cavity. Functionally applying the aforementioned apparatus having a sludge therein provides a method of dewatering sludge.

22 Claims, 2 Drawing Sheets

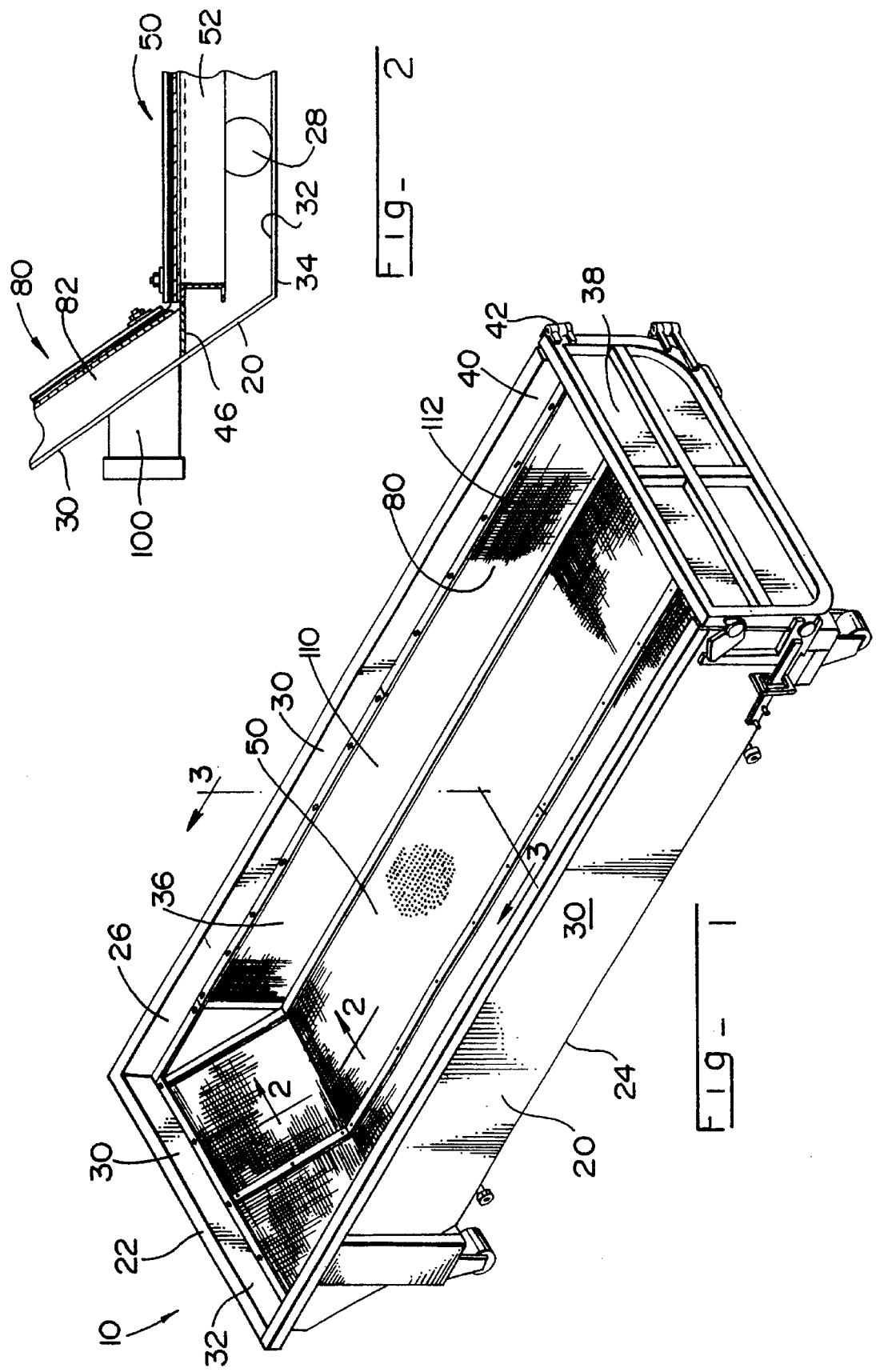

SLUDGE FILTRATION SYSTEM AND METHOD

BACKGROUND OF THE INVENTION

1. Field of Invention

This invention relates to a filtering apparatus. More specifically, it is directed to an improved filtration system for extracting liquid from a sludge or slurry and separating the resulting liquids and solids for separate disposal or recovery.

Sludge includes any solid-liquid sludge and slurry such as sewage and industrial waste. The sludge may contain any ratio of liquids to solids. In fact, the sludge often has substantially more solid material than liquid material. Separation of the sludge into its liquid and solid components, also known as "dewatering," is desirable for recovery or disposal of the one or both of the components.

One typical manner of dewatering sludge involves placing the sludge into a container that has filters therein. The liquid in the sludge passes through the filters and from the container. However, the filters do not permit the solids to pass therethrough. Therefore, the solids remain in the container and are removed after the dewatering operation is complete.

Generally, the fluid is drawn through the filter in one of two ways, vacuum drainage or gravitational drainage. Vacuum drainage requires the use of a pump in flow communication with the filtrate cavity of the filter. In order to utilize a pump that can develop a vacuum, the filtrate cavity must remain below the liquid surface level at all times.

In addition, vacuum drainage often results in filter blockage. In this type of system, activation of the pump draws the sludge liquid as well as the sludge solids toward the filters. However, during the initial stages of dewatering when the liquid concentration is highest, the smaller sludge solid particles more readily flow toward the filter and tend to block the filter element. Blockage of the filter element hinders dewatering speed and efficiency.

Gravitational drainage does not require a vacuum and, therefore, does not require maintenance of the filtrate cavity below the sludge liquid surface. Consequently, the filters in such a system can extend the entire height of the container and, thereby, provide greater drainage surface area. Also, because gravitational drainage is slower than vacuum drainage, the sludge solid particles settle on the filter surface in a more uniform manner and provide an additional filtering layer. Thus, the filters do not experience blockage. However, as mentioned, gravitational drainage is relatively slow.

2. Related Art

The described sludge dewatering systems have long been known to the prior art. Illustrative of such systems are U.S. Pat. No. 392,607, U.S. Pat. No. 3,970552, German Pat. No. 3,604,616 Al, and U.S. Pat. No. 4,871,545.

Though the above referenced and described dewatering systems may be helpful in dewatering sludge, they can be improved to provide faster and more efficient sludge dewatering and filtration.

SUMMARY OF THE INVENTION

Accordingly, the objectives of this invention are to provide, inter alia, a sludge filtration system that:

provides for fast, efficient filtration and dewatering of sludge;

provides for vacuum drainage of the sludge liquid while eliminating the problem of filter blockage;

provides both a vacuum drainage system and a gravitational drainage system independent from each other;

allows for selective or simultaneous gravitational drainage and vacuum drainage;

facilitates removal of the dewatered sludge solids from the system; and provides for maximum filter surface area.

Other objects of the invention will become apparent from time to time throughout the specification and claims as hereinafter related.

To achieve such improvements, my invention is a sludge filtration system for separating sludge solids and sludge liquids. The sludge filtration system includes a container constructed to receive and maintain a sludge therein. Within the container are two filter assemblies. The construction of the first filter assembly is such that the filter remains below the sludge when sludge is in the container. In this way, a pump, maintained in flow communication with the first filtrate cavity by a conduit, can maintain a vacuum in the filtrate cavity and provide for vacuum separation of the sludge liquids from the sludge solids and vacuum evacuation of filtrate from the first filtrate cavity. The second filter assembly filtrate cavity is connected to a second conduit. The second conduit is positioned and constructed to provide for gravitational separation of the sludge liquids from the sludge solids and gravitational evacuation of filtrate from the second filtrate cavity.

BRIEF DESCRIPTION OF THE DRAWING

The manner in which these objectives and other desirable characteristics can be obtained is explained in the following description and attached drawings in which:

FIG. 1 is an isometric view of the sludge filtration system.

FIG. 2 is a partial cross-sectional view of the sludge filtration system.

DETAILED DESCRIPTION OF THE INVENTION

Figure 3:
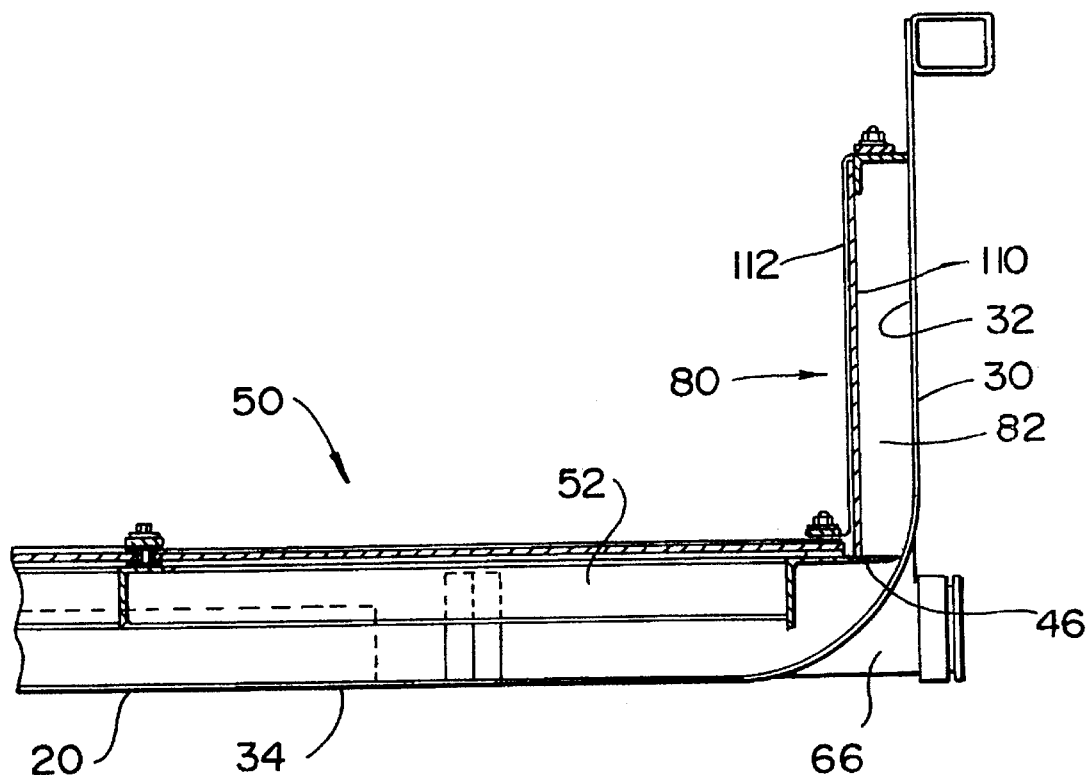
FIG. 3 is a partial cross-sectional view of the sludge filtration system.
Figure 4:
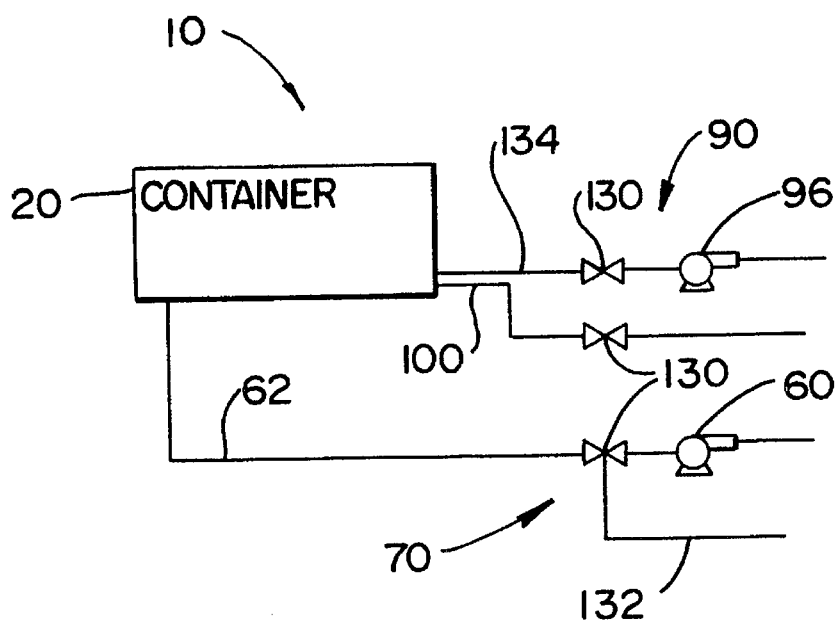
FIG. 4 is a plan view of the sludge filtration system.

The preferred embodiment of my invention is illustrated in FIGS. 1 through 4 and the sludge filtration system is depicted as 10.

Generally, sludge 140 includes, inter alia, any solid-liquid sludge and slurry such as sewage and industrial waste. As indicated, the sludge contains sludge solids and sludge liquids. In treating the sludge, it is desirable to separate the sludge liquids from the sludge solids for recovery or disposal of the individual components. The sludge filtration system 10 provides for and facilitates the desired component separation.

Basically, the sludge filtration system 10 comprises a container 20, a first filter assembly 50 within the container 10 constructed and adapted to provide for vacuum evacuation of filtrate 142, and a second filter assembly 80 within the container 20 constructed and adapted to provide for gravitational evacuation of filtrate.

The container 20 is constructed to receive and maintain the sludge 140 therein. Generally, the container 20 comprises a container bottom 34 at the container bottom end 24 and container side walls 30 extending upwardly from the perimeter of the container bottom 34 to form a basin. The container bottom 34 and the container side walls 30 define a container cavity 36 therebetween. The container bottom 34 and container side walls 30 are sealingly connected to prevent the escape of sludge liquid from the container cavity 36.

To facilitate receipt of sludge 140 into the container 20, the container top end 22 includes a container top opening 26 constructed to receive sludge therethrough. The container top opening 26 may simply comprise an open container top end 22 wherein the container has no cover and the container opening 26 is defined by the upper edges of the container side walls 30. Alternatively, in a container 20 having a cover, the container opening 26 may comprise an opening through the cover.

Container bottom openings 28 extending through the container 20 provide a communication passageway for the communication conduits, 66 and 100. These bottom openings 28 may serve either as a drainage orifice or as an opening through which the communication conduits, 66 and 100, extend. In either case, the bottom openings 28 sealingly abut the communication conduits, 66 and 100, to prevent the escape of sludge 140 therebetween.

The construction of the container 20 facilitates removal of dewatered sludge therefrom. In a first embodiment, one of the container side walls 30, the gate container side wall 38, rotatably connects to an adjacent side wall, the support container side wall 40, by a hinge 42. Alternatively, the gate container side wall 38 rotatably connects to both adjacent side walls by a hinge 42. In both embodiments, the gate container side wall 38 may selectively rotate to an open position and, thereby, provide a container side opening 44. With the gate side wall 38 in the open position, the dewatered sludge is more easily removed through the container side opening 44. In the closed position, however, the gate container side wall 38 sealing mates with the container bottom 34 and the adjacent container side walls 30 to prevent the escape of sludge 140 from the container 20.

A second preferable construction feature of the container 20 that promotes easy removal of the dewatered sludge therefrom is the tilt design. This tilt design may include any known hinged container 20 design or container 20 lifting design.

In general, both the first filter assembly 50 and the second filter assembly 80 comprise a rigid filter support 110 constructed to permit the flow of filtrate therethrough. Disposed upon and attached to the filter support 110, a filter media 112 filters the sludge liquid from the sludge solid. The filter media 112 porosity permits the flow of sludge liquids therethrough but prevents the flow of sludge solids therethrough. The sludge liquid that passes through the filter media 112, the filtrate, flows into the respective filtrate cavity, 52 or 82, defined by the respective filter assembly, 50 or 80.

Preferably, a separator plate 46, made of a nonporous material, lies between the first filtrate cavity 52 and the second filtrate cavity 82. The separator plate 46 sealingly divides the first filtrate cavity 52 from the second filtrate cavity 82 and, thereby, facilitates maintenance of a differential pressure in the first filtrate cavity 52.

Essentially, the filtrate cavity, 52 or 82, is defined in one of two ways. First, the filtrate cavity, 52 or 82, may comprise the cavity defined by the filter support 110 alone. In this case, the filter support 110 forms a filter support box 114 having a hollow interior. The hollow interior, in this design, is the filtrate cavity, 52 or 82.

Second, the filtrate cavity, 52 or 82, may comprise the cavity defined by the filter support 110, the container inner surface 32, and the separator plate 46. The filter support 110 is made of a substantially flat plate 116 extending substantially the full length of the container cavity 36 and sealingly abutting the separator plate 46 at the edges of the flat plate 116. A cavity is thereby defined between the flat plate 116, the container inner surface 32, and the separator plate 46. The cavity so defined is the filtrate cavity, 52 or 82.

The first filter assembly 50 is constructed and positioned to be maintained below the sludge 140 when the container 20 has a sludge 140 therein. Thus, the first filtrate cavity 52 is at all times sealed from the atmospheric air by the sludge 140 and a pump may maintain a vacuum therein. Maintaining a vacuum in the first filtrate cavity 52 is essential for the dewatering of certain sludges.

Preferably, the first filter assembly 50 extends horizontally proximal the container bottom 34. With the first filter assembly 50 extending the entire length and width of the container cavity 36 and, thereby, substantially conforming to the shape and size of the container bottom 34, the first filter assembly 50 forms a false bottom below which the sludge 140 cannot flow. Thus, the first filter assembly 50 is maintained below the sludge 140 when the container 20 has sludge 140 therein.

At least one first filtrate discharge conduit 66 provides a passageway for evacuation of filtrate 142 from the first filtrate cavity 52. Further, the first filtrate discharge conduit 66 provides flow communication between the first filtrate cavity 52 and the first pump means 60 for creating a differential pressure that is lower than the atmospheric pressure in the filtrate cavity and evacuating filtrate from the first filtrate cavity 52. Generally, the first filtrate conduit 66 may comprise any hollow pipe arrangement constructed to transport a liquid therein. The first pump means 60 may comprise any type of liquid pump capable of operating under "dry" conditions but is preferably a peristaltic pump 122 or a diaphragm pump 120.

An alternative design includes a first filtrate evacuation selection means 70 for facilitating alternative selection of vacuum evacuation of filtrate 142 from the first filtrate cavity 52 using the first pump means 60 and gravitational evacuation of filtrate from the first filtrate cavity 52. In this design, a valve 130 in the first filtrate conduit 66 directs the flow from the first filtrate cavity 52 either through the first pump means 60 for vacuum evacuation or through a first alternate parallel line 132 that provides for only gravitational evacuation of the first filtrate cavity 52. A second design for the first filtrate evacuation selection means 70 is to simply provide separate evacuation conduits, one for vacuum evacuation and one for gravitational evacuation. Each of these separate evacuation conduits includes a closable valve. Thus, the first filter assembly 50 may initially provide for gravitational evacuation of filtrate 142 and permit formation of an additional filtering layer on the first filter assembly 50. After this initial stage, the activation of the first pump means 60 provides for rapid separation of the sludge liquids from the sludge solids by vacuum evacuation. Finally, if the amount of sludge liquids is insufficient to maintain a vacuum in the first filtrate cavity 52, maintaining a pump suction on the first filtrate cavity 52, air drawn through the filter cake disposed on the filter media 112 enhances drying of the filter cake. In the alternative, the first filter assembly 50 can provide for gravity drainage of the container 20.

At least one second filter assembly 80 in the container 20 defines a second filtrate cavity 82, as described above, and provides for gravitational evacuation of filtrate 142 therefrom. Preferably, the second filter assembly 80 is proximal and parallel to the container side walls 30 and extends the entire length, or perimeter, of the container side walls 30. In addition, the second filtrate assembly 80 preferably extends from the separator plate 46 positioned proximal the container bottom 34 to the container top end 22. In this way, the second filter assembly 80 substantially covers the container side walls 30 and acts as a false wall. Thereby, the second filter assembly 80 maximizes the filtering surface area.

At least one second filtrate discharge conduit 100 provides for gravitational evacuation of filtrate 142 from the second filtrate cavity 82. Like the first filtrate discharge conduit 66, the second discharge conduit 100 may include a second filtrate cavity evacuation selection means 90. The second filtrate cavity evacuation selection means 90 facilitates alternative selection of vacuum evacuation of filtrate 142 from the second filtrate cavity 82 and gravitational evacuation of filtrate 142 from the second filtrate cavity 82. A second pump means 96 for creating a differential pressure that is lower than the atmospheric pressure in the filtrate cavity and evacuating filtrate from the second filtrate cavity 82 provides for the vacuum evacuation of filtrate 142. The second filtrate cavity evacuation selection means 90 may simply comprise a valve 130 in the second filtrate discharge conduit 100. The valve 130 directs the filtrate 142 for either gravitational evacuation of the filtrate 142 or through a second alternate parallel line 134 to the second pump means 96 for vacuum evacuation of filtrate 142. Another design for the second filtrate cavity evacuation selection means 90 is to simply provide separate evacuation conduits, one for vacuum evacuation and one for gravitational evacuation. Each of these separate evacuation conduits includes a closable valve.

Because the second filter assembly 80 preferably extends to the container top end 22 and, thus, continuous maintenance of a vacuum is not possible, the second pump means 96 is preferably a pump 122 that can maintain a vacuum when sealed from the atmosphere and that is capable of operating under a dry condition. Examples of such pumps include peristaltic pumps and diaphragm pumps. However, the second filter assembly 80 construction may accommodate other pump types by incorporating level switches that control the activation of the pump and that control the valve 130. Including the second pump means 96 permits rapid separation of the sludge solids from the sludge liquids. Incorporation of the second filter assembly 80 that provides for gravitational drainage maximizes the filter surface area and allows for the initial gravitational evacuation wherein a filtering layer develops on the filters and, thereby, prevents filter blockage.

Introducing a sludge 140 into the aforementioned sludge filtration system 10 and functionally applying the sludge filtration system 140 provides a method of dewatering the sludge 140 and separating the sludge solids from the sludge liquids. Generally, sludge is first introduced into the container 20. Initially, evacuation of the sludge liquids is limited to gravitational drainage. During this initial stage, a filtering layer, or filter cake, forms on the filter media 112 due to the slow settling of the sludge solids. When the fluids reach their natural drainage level, the first pump means 60 is activated and provides for vacuum filtration of the sludge 140. If the sludge becomes so dry that the first pump means 60 can no longer maintain a vacuum in the first filtrate cavity 52, maintaining a suction with the first pump means 60 enhances drying of the filter cake.

I claim:

1. A sludge filtration system comprising:

a container having container side walls and a bottom constructed to receive and maintain a sludge therein;

at least one first filter assembly positioned in said container;

said at least one first filter assembly defining a first filtrate cavity bounded by said first filter assembly, said container side walls, said container bottom and a lower surface of a separator plate;

said at least one first filter assembly constructed and positioned to be maintained below said sludge when said container contains said sludge therein;

thereby facilitating maintenance of a differential pressure that is lower than the atmospheric pressure in said first filtrate cavity;

a first pump means for creating a differential pressure that is lower than the atmospheric pressure in said first filtrate cavity and evacuating filtrate from said first filtrate cavity;

at least one first filtrate discharge conduit providing flow communication between said first filtrate cavity and said first pump means;

at least one second filter assembly positioned in said container;

said at least one second filter assembly defining a second filtrate cavity bounded by said at least one second filter assembly, said container side walls, and an upper surface of said separator plate, wherein said separator plate sealingly separates said first filtrate cavity from said second filtrate cavity; and at least one second filtrate discharge conduit positioned and constructed to provide for gravitational evacuation of filtrate from said second filtrate cavity.

2. A sludge filtration system as claimed in claim 1 wherein:

said container having a container top end and a container bottom end;

a top opening in said container top end constructed to receive sludge therethrough; and at least one container bottom opening in said container bottom end.

3. A sludge filtration system as claimed in claim 1 wherein said container is constructed to facilitate removal of dewatered sludge therefrom.

4. A sludge filtration system as claimed in claim 3 wherein:

said container side walls and said container bottom defining a container cavity;

said container side walls having a gate container side wall hinged to at least one adjacent support container side wall; and said gate container side wall selectively rotatable relative to said at least one support container side wall to an open position to thereby facilitate the removal of dewatered sludge from said container cavity.

5. A sludge filtration system as claimed in claim 1 wherein said at least one first filter assembly comprises:

a rigid filter support constructed to permit the flow of filtrate therethrough;

a filter media disposed on and attached to said filter support;

said filter media constructed to permit the flow of filtrate therethrough; and said filter media constructed to prevent the flow of sludge solids therethrough.

6. A sludge filtration system as claimed in claim 5 wherein:

said rigid filter support comprises a filter support box of rigid material; and said filter support box defining said first filtrate cavity therein.

7. A sludge filtration system as claimed in claim 1 wherein:

said at least one first filter assembly extends horizontally proximal a container bottom; and thereby said at least one first filter assembly is maintained below said sludge when said container contains said sludge therein.

8. A sludge filtration system as claimed in claim 7 wherein said at least one first filter assembly substantially conforms to the shape and size of the said container bottom.

9. A sludge filtration system as claimed in claim 1 wherein said first pump means comprises a pump that can maintain a vacuum when sealed from the atmosphere and that is capable of operating under a dry condition.

10. A sludge filtration system as claimed in claim 9 wherein said first pump means comprises a diaphragm pump.

11. A sludge filtration system as claimed in claim 9 wherein said first pump means comprises a peristaltic pump.

12. A sludge filtration system as claimed in claim 1 further comprising a first filtrate cavity evacuation selection means for facilitating alternative selection of vacuum evacuation of filtrate from said first filtrate cavity using said first pump means and gravitational evacuation of filtrate from said first filtrate cavity.

13. A sludge filtration system as claimed in claim 12 wherein said first filtrate cavity evacuation selection means comprises a valve in said at least one first filtrate discharge conduit.

14. A sludge filtration system as claimed in claim 1 wherein said at least one second filter assembly comprises:

a rigid filter support constructed to permit the flow of filtrate therethrough;

a filter media disposed on and attached to said filter support;

said filter media constructed to permit the flow of filtrate therethrough; and said filter media constructed to prevent the flow of sludge solids therethrough.

15. A sludge filtration system as claimed in claim 14 wherein:

said rigid filter support comprises a filter support box of rigid material; and said filter support box defining said second filtrate cavity therein.

16. A sludge filtration system as claimed in claim 1 wherein:

said at least one second filter assembly substantially extending the entire perimeter of said side walls.

17. A sludge filtration system as claimed in claim 16 wherein said at least one second filter assembly extends from a separator plate positioned proximal said container bottom to a container top end.

18. A sludge filtration system as claimed in claim 1 further comprising:

a second pump means for creating a differential pressure that is lower than the atmospheric pressure in said second filtrate cavity and evacuating filtrate from said second filtrate cavity;

said at least one second filtrate discharge conduit providing flow communication between said second filtrate cavity and said second pump means; and a second filtrate cavity evacuation selection means for facilitating alternative selection of vacuum evacuation of filtrate from said second filtrate cavity using said second pump means and gravitational evacuation of filtrate from said second filtrate cavity.

19. A sludge filtration system as claimed in claim 18 wherein said second filtrate cavity evacuation selection means comprises a valve in said at least one second filtrate discharge conduit.

20. A sludge filtration system as claimed in claim 18 wherein said second pump means comprises a pump that can maintain a vacuum when sealed from the atmosphere and that is capable of operating under a dry condition.

21. A sludge filtration system as claimed in claim 20 wherein said second pump means comprises a diaphragm pump.

22. A sludge filtration system as claimed in claim 20 wherein said second pump means comprises a peristaltic pump.

* * * * *